United States Patent
Wilderbeek et al.

(10) Patent No.: US 7,300,688 B2
(45) Date of Patent: Nov. 27, 2007

(54) ALIGNMENT LAYER COMPRISING A FIRST AND SECOND SUBLAYER

(75) Inventors: Johannes T. A. Wilderbeek, Veghel (NL); Dirk J. Broer, Geldrop (NL); Cornelis W. M. Bastiaansen, Montfort (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 149 days.

(21) Appl. No.: 10/490,157

(22) PCT Filed: Sep. 23, 2002

(86) PCT No.: PCT/EP02/10723
§ 371 (c)(1),
(2), (4) Date: May 5, 2004

(87) PCT Pub. No.: WO03/029887
PCT Pub. Date: Apr. 10, 2003

(65) Prior Publication Data
US 2004/0262402 A1    Dec. 30, 2004

(30) Foreign Application Priority Data
Sep. 24, 2001  (EP) .................. 01203611
Oct. 3, 2001  (EP) .................. 01203744

(51) Int. Cl.
*G02F 1/1337* (2006.01)
(52) U.S. Cl. ............ 428/1.2; 349/125; 349/129; 283/94
(58) Field of Classification Search ........... 428/1.2; 349/125, 129; 283/91, 94, 107–110
See application file for complete search history.

(56) References Cited

U.S. PATENT DOCUMENTS

| 4,201,453 | A | * | 5/1980 | Kobale et al. .............. 349/124 |
| 4,464,134 | A | * | 8/1984 | Lackner et al. .............. 445/24 |
| 5,853,818 | A | | 12/1998 | Kwon et al. ................ 427/510 |
| 6,128,058 | A | * | 10/2000 | Walton ....................... 349/129 |
| 6,436,615 | B1 | * | 8/2002 | Brandow et al. ........... 430/324 |
| 6,706,359 | B2 | * | 3/2004 | Mino et al. ............... 426/64.1 |
| 6,734,936 | B1 | * | 5/2004 | Schadt et al. ............. 349/117 |

FOREIGN PATENT DOCUMENTS

JP    A 10-153783    6/1998

OTHER PUBLICATIONS

Gupta et al.; "Design of Surfaces for Patterned Alignment of Liquid Crystals on Planar and Curved Substrates"; XP-002115847; Science, vol. 276; Jun. 6, 1997; pp. 1533-1536.

* cited by examiner

*Primary Examiner*—Rena Dye
*Assistant Examiner*—Sow-Fun Hon
(74) *Attorney, Agent, or Firm*—Oliff & Berridge, PLC

(57) ABSTRACT

The invention pertains to an alignment layer capable of aligning liquid crystal material, the alignment layer comprising: a first sublayer having regions capable of aligning the liquid crystal material in a first alignment, a second sublayer having regions capable of aligning the liquid crystal material in a second alignment, the first and the second alignment being different, the second sublayer overlaying the first sublayer and covering in accordance with a predetermined pattern the first sublayer to provide, at desired locations, second sublayer regions capable of aligning the liquid crystal material and, at desired locations, regions of the underlying first sublayer that are not covered by the second sublayer, and to a method of making this alignment layer. The invention further relates to an optical or electro-optical device comprising said alignment layer.

22 Claims, 1 Drawing Sheet

Fig. I
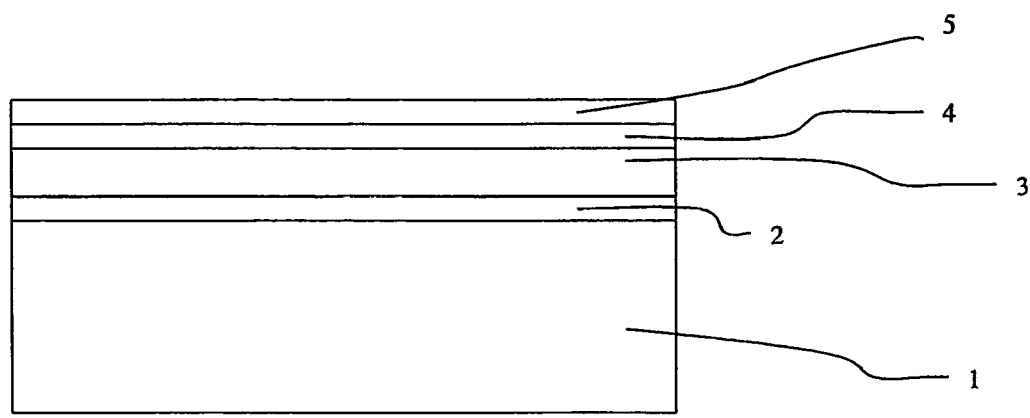

ALIGNMENT LAYER COMPRISING A FIRST AND SECOND SUBLAYER

The invention pertains to an alignment layer capable of aligning liquid crystal material. The invention further pertains to an optical or electro-optical device comprising the alignment layer, and to a method of manufacturing said layer.

Alignment layers for aligning a liquid crystal material (also referred to as orienting layers) are conventionally made of rubbed polyimide. The rubbing process creates dust and causes static charging of the substrate to which the layer is applied, making it incompatible with clean room environments and introducing defects in the alignment layers.

Alternative alignment layers are isotropic polymer layers carrying embossed micro-grooves, and photo-alignment layers of photo-polymers, which may be rendered capable of aligning liquid crystal material by means of irradiation with polarized light.

The types of alignment (planar, homeotropic, azimuthal), which are available when such layers are used are limited and it is difficult to set a pre-tilt accurately to a selected value.

Furthermore, alignment layers comprising self-assembled monolayers (SAM's) provided onto a gold substrate suffer from limited transparency due to light absorption by the gold substrate. It was shown by Gupta and Abbott, *Science*, 276, pp. 1533-1536, 1997, that it is possible to use SAM's of alkanethiols on gold to induce the controlled alignment of liquid crystals deposited on monolayers. Through microcontact printing techniques it was possible to induce both homeotropic and planar alignment within one substrate. Depending on the type of alkanethiol and the method of gold deposition both the azimuthal (in the plane of the substrate) and the polar (away from the substrate) angle of the anchoring liquid crystal can be controlled. However, the methods reported by Abbott (and others) are restricted with respect to the optical properties of these assemblies. The thickness of the gold layers that are used is equal to or significantly above 10 nm, the layers are only semi-transparent and possess a strong absorption band in the visible wavelength region (about 50% absorption at $\lambda$=500 nm). Of course, this light absorption influences the performance of flat panel displays independent of whether they are used in the transmissive, transreflective, or reflective mode. In all cases the light absorption causes light losses and a reduction in energy efficiency of battery life of the liquid crystal display. More importantly, the production of full color displays with high color purity becomes at least very problematic.

In JP 10-153783 an alignment film was disclosed without the need of a rubbing treatment. The alignment film was provided onto a novolak resin, which was exposed to UV irradiation through a mask to form a monomolecular layer by chemical reaction with a tetra-alkyl silane compound. In this manner an alignment film can be formed with regions capable of orienting liquid crystalline material. This device, however, allows orientation in one direction only.

An alignment layer with regions that allow orientation in two directions was disclosed in U.S. Pat. No. 5,853,818. However, regions with different alignment orientations are provided in a single-layered alignment layer. When the two regions of different alignment orientations are positioned in one layer, it is not feasible to obtain various types of alignment, i.e. it is not possible to obtain an alignment layer having two of the planar, homeotropic, and azimuthal alignments types. It is an objective of the present invention to provide in an alignment layer that contains two different types of alignment.

The invention more particularly, pertains to the molecular alignment of liquid crystals at interfaces of layers. The alignment is of practical relevance for displays based on liquid crystals, for security marks and for electro-optical devices that are used as light switches, for instance in telecommunication systems. Liquid crystals are well known for their ability to switch light when they are brought from one alignment type to another for instance by an electrical field. Thereto the field-off alignment is established by bringing the liquid crystals in contact with substrates that are provided with special coatings. Coatings which are known to give liquid crystal alignment and which are nowadays widely used are thin, e.g. 200 nm, polyimide layers that are rubbed by soft tissue. This rubbing or buffing provides a preferential orientation in the surface of the polyimide, which may molecular (aligned polymeric chains) or macroscopic (nanometer scale scratches) in nature. The alignment is taken over when a liquid crystal is brought on top of the rubbed polyimide. The alignment is planar or planar with a small tilt angle, depending on the composition of the polyimide. Another alignment principle is based on treatment of the surface with surfactant type of molecules. Known are for instance gold surfaces that are treated with thiol molecules, which provides planar or vertical (homeotropic) alignment, depending on the type of thiol and treatment method. By these alignment methods it is difficult to achieve multiple alignment directions on one single substrate. Thereto other alignment principles have been worked out based on photo-alignment. Films of polyvinylcinnamate or polymers with similar olefinic units are exposed through a mask with polarized UV light. The direction of polarization imposes a preferential orientation in the liquid crystal that is brought on top, which may be parallel or perpendicular to the polarization of light depending on the material. By a second exposure with polarized light without a mask the initially unexposed areas also become oriented. In this way two or more orientations of the liquid crystals can be established on a single substrate. However, the orientations are always in plane with the substrate or with a small pre-tilt. It is however not possible to combine the planar alignment with a homeotropic alignment in simple processing steps.

The invention now provides a means to give an orientating polymer layer that may combine planar alignment of the liquid crystals in various directions together with vertical or azimuthal alignment. More generally, the invention provides in an alignment layer wherein the first and/or the second sublayer is capable of aligning the liquid crystal material in a planar, an azimuthal or a homeotropic alignment.

The invention therefore relates to an alignment layer capable of aligning liquid crystal material, the alignment layer comprising:

a first sublayer having regions capable of aligning the liquid crystal material in a first alignment, a second sublayer having regions capable of aligning the liquid crystal material in a second alignment, the first and the second alignment being different, the second sublayer overlaying the first sublayer and covering in accordance with a pre-determined pattern the first sublayer to provide, at desired locations, second sublayer regions capable of aligning the liquid crystal material and, at desired locations, regions of the underlying first sublayer that are not covered by the second sublayer.

In another objective the invention relates to a method of manufacturing an alignment layer capable of aligning a liquid crystal material, comprising:

providing a first sublayer;

providing a patterned second sublayer onto the first sublayer to partition the first sublayer into covered regions and non-covered regions;

rendering non-covered regions of the first sublayer
capable of aligning the liquid crystal material in a first
alignment; and
rendering regions of the second sublayer, covering the
first sublayer, capable of aligning the liquid crystal
material in a second alignment, which is different from
the first alignment.

The principle can, for instance, be as follows. A first sublayer of a polyvinylcinnamate type of material is spun on a glass substrate. This layer can be exposed through a mask to give local planar alignment. The whole surface, containing exposed and unexposed areas, is now brought in contact with a thiol-containing solution. In the presence of a thermal initiator and by the use of some heating the thiol groups are reacted with the surface double bonds that remained after the first exposure. The excess of thiols are washed away. At the location where the thiol groups have reacted the surface aligns the liquid crystal vertically. In this way a planar alignment is combined with a vertical alignment in a very controlled way.

Many variations of this method can be used, for instance, instead of a polyvinylcinnamate other olefinic polymers can be used. Preferably, these materials can undergo [2+2] photo-cycloaddition reaction that yields structures that align liquid crystals in a controlled way. For instance, coumarin-containing polymers as described by Schadt et al. in Nature (Schadt, M., Seiberle, H., Schuster, A., Nature, 381, 212-215 (1996)). Preferably, the first and the second sublayer are chemically linked at an interface of the first and the second sublayer. According to the invention the term "chemically linked" means that a covalent, an organo-metalic, or an ionic bond is formed, or that the sublayers are bonded by complexation. Preferably, the chemical linking is performed by means of a reaction between a first chemical group present on the first sublayer at the interface and a second chemical group present on the second sublayer at the interface In a preferred embodiment according to the invention the method comprises:
providing a first sublayer of photo-alignable material comprising first chemical groups;
providing onto the first sublayer and in accordance with a pre-determined pattern, a second sublayer having regions capable of aligning the liquid crystal material in a second alignment and comprising second chemical groups, the pattern being such to partition the first sublayer into regions covered by the second sublayer, and regions not covered by the second sublayer;

forming at the interface formed between the first and the second sublayer, chemical links by reacting first and second chemical groups;
subjecting at least the non-covered regions of the first sublayer to linearly polarized radiation to provide exposed regions capable of aligning the liquid crystal material in a first alignment.

More preferably the method comprises:
providing a first sublayer of alignable material comprising first chemical groups that are actinic radiation-sensitive such that upon irradiating the material the first chemical group is converted to render the first chemical group at least to a lesser extent capable of reacting with the second chemical group;
irradiating the first sublayer in accordance with a pre-determined pattern to provide regions comprising first chemical groups, preferably comprising an unsaturated moiety, and irradiated regions wherein the first chemical groups are rendered at least to a lesser extent capable of reacting with second chemical groups;
subjecting the first sublayer to alignment enabling means to render the first sublayer capable of aligning the liquid crystal material in a first alignment;
providing on the first sublayer and optionally in accordance with a pre-determined pattern, a second sublayer having regions capable of aligning the liquid crystal material in a second alignment and comprising second chemical groups;
forming at the interface formed between the first and the second sublayer, chemical links by reacting first and second chemical groups;
removing second sublayer material at irradiated regions to uncover regions of the first sublayer capable of aligning the liquid crystal material in a first alignment.

It can be advantageous to simultaneously execute the steps of irradiating the first sublayer of alignable material, comprising actinic radiation-sensitive first chemical groups, which render the first sublayer capable of aligning the liquid crystal material in a first alignment upon irradiation, and subjecting the first sublayer to alignment. Preferably, the first chemical group comprises an unsaturated moiety, and the second chemical group is a thiol group, an amino group or a group, which is photo-cleavable or thermo-cleavable to produce a free radical.

Some non-limitative examples of materials are:

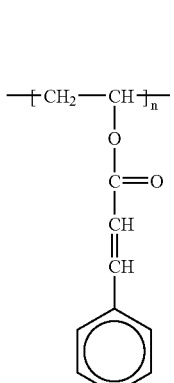
polyvinyl cinnamate

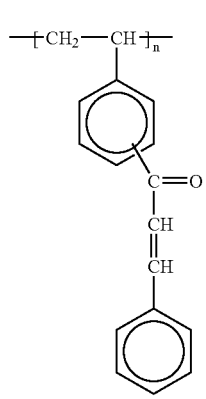
polystyrene cinnamyl ketone

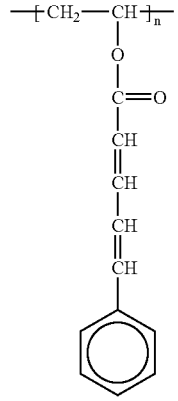
polyvinyl cinnamylidene ester

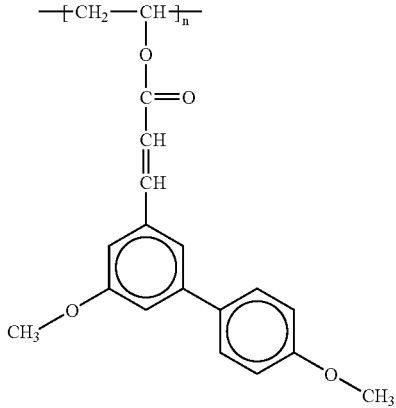

-continued
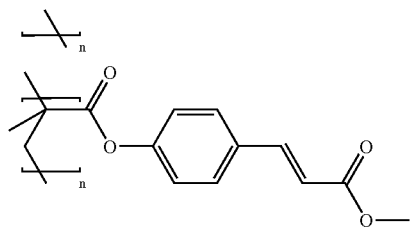
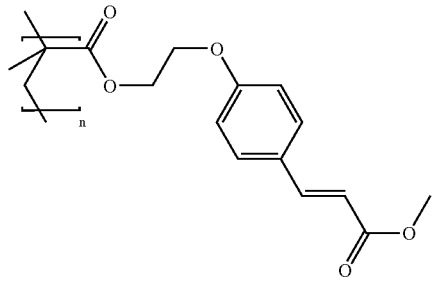
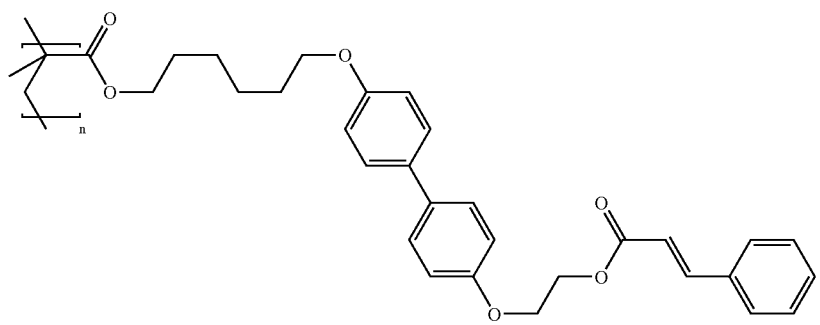
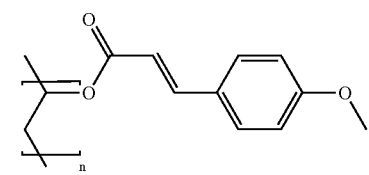
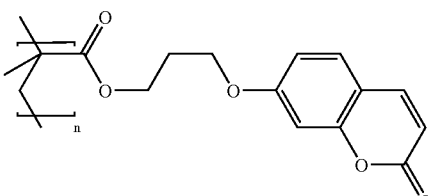
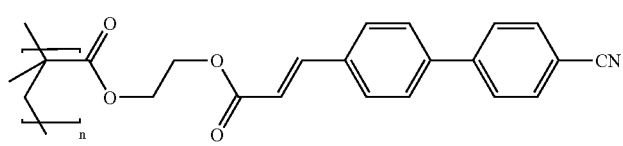
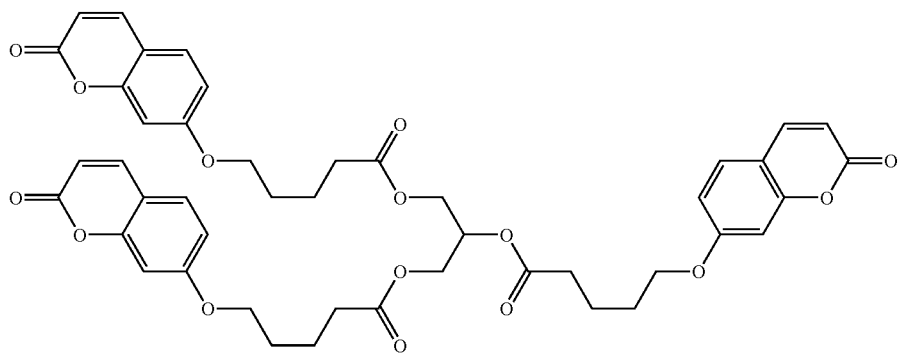
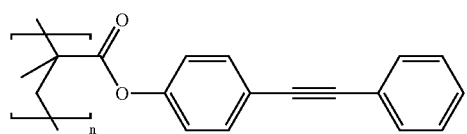

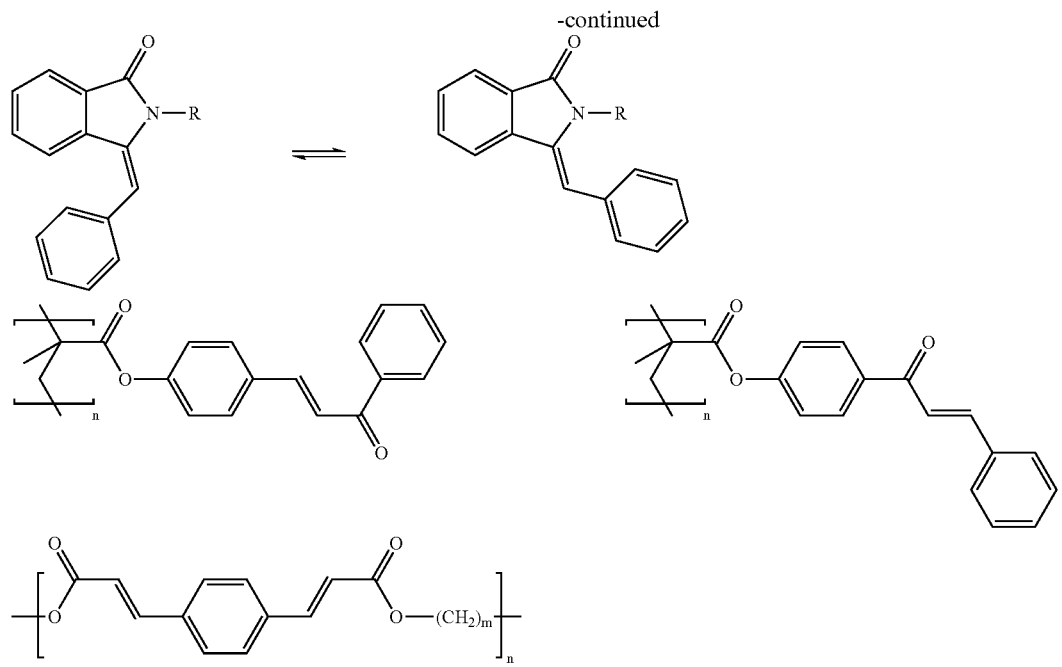

Preferred alignment layers have a first sublayer, which is a solid organic layer, preferably a polymeric layer or a polymer precursor layer and preferably the second sublayer is a solid organic layer, a photo-patternable organic layer, an organic monolayer, or an organic self-assembled monolayer. A polymer precursor layer is a layer of a precursor that can be polymerized by applying irradiation or heat. Such layers include layers of photo-polymers.

In an embodiment of the invention is one of the first and second chemical groups sensitive to actinic radiation such that when having received a suitable dose of such radiation, said chemical group is at least to a lesser extent capable of reacting with the other chemical group, than when said chemical group was not irradiated.

In another embodiment one of the first and second chemical groups is obtainable by means of actinic radiation from a precursor group or a combination of precursor groups, which is at least to a lesser extent capable of reacting with the other chemical group than the group obtained from the precursor group or the combination of precursor groups.

Whereas it is believed that the azimuthal LC (liquid crystalline) alignment originates from the cycloaddition reaction for cinnamates and coumarins, the photoinduced E/Z isomerization also plays a role in the LC alignment by cinnamates. Generally, planar alignment of liquid crystals is achieved using linearly polarized UV, and alignment directions both parallel and perpendicular to the polarization direction of the light can be established. However, high pre-tilts of anchoring liquid crystals leading to homeotropic alignment have been difficult to accomplish, certainly by using only one photo-alignment material within a substrate. To illustrate the patterning options, a photo-alignment material was irradiated with polarized UV light. The class of the photo-alignment material was described in the literature. The material demonstrates alignment of the liquid crystal parallel to the direction of the electrical field of the polarized light to which it was exposed, as was shown for the coumarin derivatives. The material will be referred to as linear photo-polymerized (LPP) material.

It was found that the irradiation conditions are an important parameter for the outcome of the liquid crystal anchoring. Irradiation of the LPP precursor by uncollimated, unpolarized UV light resulted in random alignment of liquid crystals, as expected. The alignment resulting from irradiation by (uncollimated) linearly polarized UV light strongly depended on the exposure time. Short exposure times (e.g. 35 minutes) resulted in a homeotropic anchoring. However, the homeotropic anchoring does not represent a stable, fully cured state, as the LC alignment changed from homeotropic to planar upon continued UV exposure (e.g. additionally 25 minutes). Similar observations have been reported before where the direction of planar alignment with respect to the polarization direction of the UV light was changed upon longer exposure. Yet, transitions from homeotropic to planar alignment were not reported. The versatility of the photo-alignment technique can be demonstrated by polarized optical micrographs. Bi-directional planar alignment can be readily obtained by adjusting the polarization direction of the UV light. Yet, high pre-tilts leading to homeotropic anchoring are still difficult to establish, as the homeotropic anchoring results from an unstable intermediate state that degenerates upon further exposure to yield a planar anchoring.

According to the present invention a novel concept is introduced that may result in stable patterned homeotropic and bi-directional planar aligned areas within one substrate. For this purpose, a thiolene addition reaction can be utilized to covalently link a SAM to the photo-alignment layer. The term "SAM" as used in the present invention means a self assembled monolayer, or a similar layer comprising areas of irregular order and/or which may contain regions with more than one layer of molecules.

First, planar anchoring is introduced by conventional masking techniques resulting to photo-alignment through linear polarized UV light. Subsequently, the substrate is covered with a thiol compound and the thiolene addition reaction is initiated. After removing the excess thiol and subsequent cell construction, planar anchoring should be observed at the photo-aligned areas, whereas homeotropic anchoring should be observed at those areas where the SAM is covalently linked to the photo-alignment material, i.e. at the uncovered area thiolene addition covalently links a SAM to the unreacted vinyl groups inducing a homeotropic anchoring.

The following has been done: LPP material was spun onto a substrate and partly aligned in a planar fashion using linear polarized UV light. To initiate the thiolene addition reaction, several methods are possible. The addition can be initiated by direct UV-initiated coupling, with or without the aid of a photo-initiator, or by other sources of free radicals, such as thermal initiators. After immersion of the partly planar aligned substrate in n-dodecanethiol direct coupling of the thiol to the not yet reacted double bonds of the LPP material was attempted by direct UV-exposure with and without a photo-initiator added to the liquid thiol. This did not result in a homeotropic alignment of the designated area. Apparently, the cycloaddition reaction of the LPP material predominates the thiolene addition. In addition, attempts to selectively excite the thiolene addition reaction by UV exposure of a single wavelength (365 nm) gave the same negative result.

According to the invention the initiation of the thiolene addition reaction was brought about through thermal initiation. In this way, the substrate can be shielded from premature UV exposure and the cycloaddition of the LPP material may be decoupled from the thiolene addition. The thermal stability of the LPP precursor certainly favors the decoupling approach, as was confirmed by monitoring by UV-VIS spectroscopy of the absorption band of the LPP precursor at elevated temperatures (e.g. at 100° C.) for at least one hour. After the thermal processing steps a cell was constructed. The thus treated LPP layer constitutes only of one substrate whereas the opposite substrate comprises a conventional rubbed planar polyimide layer with an orientation direction perpendicular to the photo-aligned substrate. The lines were exposed to linearly polarized UV light using a photo mask whereas a SAM was attached to the yet unexposed square areas. SAM's consisting of a single thiol (for instance $C_{12}$) or a mixed thiol (for instance $C_{16}/C_{10}$) gave identical results. Polarized optical micrographs show the 90° twisted arrangement of the liquid crystal layer. The areas where the SAM was covalently linked evidently demonstrate a hybrid orientation, resulting from the local planar and homeotropic boundary conditions. Contrary to the photo-aligned materials without a SAM, the homeotropic anchoring was preserved even after prolonged UV exposure overnight demonstrating the stability of the homeotropic alignment.

The results according to the invention demonstrate the versatility of photo-alignment materials. Planar anchoring of liquid crystals can be accomplished in every direction by adjusting the polarization direction of the UV light. A novel concept, enabling the stable homeotropic anchoring by using covalently linked SAM's within a single substrate, opens a new field for the complete control of anchoring of liquid crystals. This is especially important for the further improvement of the optical characteristics of liquid crystal devices and could be the starting point for the development of completely novel display concepts.

The induced alignment of liquid crystals, i.e. homeotropic or planar orientation, can be controlled laterally in a patterned fashion. The choice with respect to the type of molecule used to construct the SAM's is not limited to the molecules described above, but can be selected from many suitable compounds, as is evident to the person skilled in the field.

In another embodiment according to the invention it is also possible to induce laterally patterned orientations in liquid crystal layers by using functionalized monolayers. This provides a versatile and powerful tool to further control the polymerization of for instance thiolene monomers and consequently the corresponding morphology. This concept comprises inducing both planar and homeotropic orientations in the liquid crystal layer of a patterned surface. By selectively introducing chemical functionalities to one of the areas, it is possible to grow polymeric structures from distinct sites and in the direction that is enforced by the local alignment layer.

The liquid crystal layers comprise regions, which are functionalized by homeotropic alignment, and regions with non-functionalized (e.g. planar) alignment. The functionalized homeotropic regions can be exploited to start polymerization in a homeotropic direction. ITO (indium tinoxide) is the preferred transparent electrical conductor.

Furthermore, the presence of a vinyl tail-group, originating from the thiol used, opens up an interesting range of possibilities. The reactive group can be used to further modify the surface of the SAM, for instance to adjust the surface free energy and hence its wetting properties by replacing the apolar vinyl group by a more polar tail-group. In addition, the vinyl group can be exploited as starting point for thiolene polymerization or as starting point of conventional free-radical polymerization, thus extending the possibilities for further morphology control and adhesion promotion.

Bi-directional control of the planar alignment was achieved by using photo-alignment layers. Moreover, a novel concept of covalently linking SAM's to double bonds of the photo-alignment material enables stable homeotropic anchoring within the same substrate.

By using, for instance functionalized SAM's, the control over the morphology within liquid crystal devices can be even further improved. This is especially important for the improvement of the (electro-)optical properties of liquid crystal devices and provides new opportunities for the development of display concepts.

Instead of a single mask wise exposure step with one single polarization direction of the UV light, multiple exposures can be utilized before the thiol treatment takes place. In this way complex patterns can be generated with two or more planar orientation directions and a vertical orientation direction. This may be of use for special display configurations but also for security features on for instance banknotes, and objects carrying such security features, sensors, and actuators.

Instead of UV exposure with incoming light along the normal also oblique exposure may be used to lead to pre-tilted alignment in the photo-aligned areas.

Instead of the described alkylthiols also other thiol groups can be used, e.g. functionalized by special end-groups to the alkyl tail.

Instead of thiol groups also other reactive groups can be considered that react to a double bond. It even may be double bonds themselves comparable to the ones that exist in the first sublayer. In that case the cinnamates or cinnamates-like groups must be provided with, for instance, long tail aliphatic groups in order to provide homeotropic alignment.

The invention allows the use of many variations. For instance, the first sublayer of the alignment layer may be obtainable from a photo-alignable material, which upon irradiation with linearly polarized light, may be rendered capable of aligning the liquid crystal material with a first alignment. It is also possible that the exposed (non-covered) regions of the first sublayer comprise material capable of aligning the liquid crystal material in a first alignment, said material being obtainable by providing a layer of photo-alignable material which is rendered capable of aligning the liquid crystal material in a first alignment when subjected to linearly polarized light and then subjecting at least at the positions corresponding to the exposed regions to linearly polarized light.

In another alternative the first sublayer is obtainable from a photo-alignable material having an actinic-radiation sensitive chemical group which, when present at the interface between the first and the second sublayer, is capable of reacting with the second chemical group to form a chemical link between the first and the second sublayer. The second sublayer may be a monolayer, such as an R-SH monolayer, R being an organic, such as an alkyl, or an organo-metallic group. In a preferred embodiment the second chemical group is a thiol group.

In a preferred alignment layer according to the invention the interfacial reaction is thermally-induced, radiation-induced, or photo-induced, optionally, in the presence of initiators, sensitizers, inhibitors, stabilizers and/or transfer agents. The interfacial reaction is preferably carried out by the reaction at selected locations in accordance with the desired pattern by, for example, pattern-wise heating or pattern-wise irradiation, and then removing any material covering the first sublayer at the non-selected locations. The second sublayer may also be obtainable by pattern-wise depositing a second sublayer-forming material onto the fist sublayer.

The first sublayer may also have a rubbed surface capable of aligning the liquid crystal material or comprises, optionally in accordance with a desired pattern, photo-aligned material capable of aligning the liquid crystal material. The first sublayer may also comprise a photo-aligned material capable of aligning the liquid crystal material, optionally in accordance with a desired pattern, obtainable by exposing a layer of photo-alignable material in accordance with the desired pattern before, simultaneous to and/or after the chemical linking of the first sublayer to the second sublayer.

Patterning may be carried out by means of, for example, a wet deposition method such as printing, micro-contract printing, ink-jet printing or a gas-phase deposition method such as vapor deposition or sputtering.

The invention is further illustrated by the following non-limitative examples.

Glass substrates were supplied by Applied Film Corporation, Boulder, USA. Slides (thickness 0.7 mm) were coated with an ITO film with a surface resistance smaller than 30 Ω.

The cleaning detergent, Extran MA 01 alkalic soap, the nematic liquid crystal mixture E7 and the chiral dopant ZLI 811 were supplied by Merck, Amsterdam, The Netherlands.

The thiols 1-decanethiol (96%), 1-dodecanethiol (98%), 1-hexadecanethiol (95%; Fluka Chemika) were purchased from Sigma-Aldrich Chem. Co., Zwijndrecht, The Netherlands.

The solvents ethanol (99.9%) and 2-propanol (99.8%) were obtained from Biosolve B.V., Valkenswaard, The Netherlands. All chemicals were used as delivered.

A photo-alignment precursor LPP JP-265 was obtained from Rolic Ltd., Basel, Switzerland.

UV-VIS transmission spectra were determined using a Shimadzu UV-3102 PC UV-VIS-NIR scanning spectrophotometer. All measurements were conducted at room temperature against air. The wavelength range was set at 300-700 nm with a slit width of 2 mm at a fast measurement speed. The error in the obtained transmittance values was determined to be within 4%.

Polarized optical microscopy was performed with an Axioplan 2 imaging microscope equipped with a digital camera.

Contact angle measurements (Kruss drop shape analysis system DSA 10) were performed by measuring the angle between a water droplet and the surface through a microscope objective. The results from several measurements were averaged to give the contact angle.

Self-assembled monolayers were prepared from 1 mM solutions of a thiol in ethanol or tetrahydrofuran. Substrates with a deposited gold film were immersed in approximately 15 ml of the solution for three minutes. Subsequently, the substrates were rinsed with the corresponding solvent and dried under nitrogen.

Micro-contact prints were prepared from polydimethylsiloxane (PDMS) stamps, and inked with the appropriate thiol.

The substrates used consist of several layers deposited on a glass substrate. A typical configuration is indicated in FIG. 1. On top of the glass substrate 1, a transparent electrical conductor 2, preferably indium tinoxide (ITO) is applied. Covering the ITO is a first sublayer 3, for instance a photo-alignment layer. The second sublayer 4 is deposited, for instance by depositing a SAM by micro-contact printing. Onto the first and second sublayers a liquid crystal layer 5 is applied. Optionally, other layers, such as a cover layer (not shown), may also be applied.

The glass substrates 1, already containing the ITO layer 2, were cleaned with a 5% v/v Extran MA-01 alkalic soap solution, rinsed extensively with demineralized water, washed with isopropanol and dried under vacuum (30 minutes, 40° C.). Thin films 3 (about 70 nm) of a photo-alignment precursor (LPP JP-265) were deposited by spinning (Karlsuss RC 8, CT 62 spin coater; 500 rpm (5 sec, open), 1100 rpm (30 sec, closed), 900 rpm (17 sec, open)) and subsequent drying at 100° C. for 20 minutes.

Curing of the photo-alignment material was done by placing the substrate under an uncollimated UV light source (Philips type HB 172, 75 W, 4× Philips 15 W UV-type 3) and irradiating the surface through a UV-polarizer.

Covalent attachment of a SAM 4 to the not yet reacted photo-alignment material was done by dissolution of 1% w/w of a thermal initiator (2,2-azobis(isobutyronitrile); AIBN; half-life 12 min at 101° C.) in a thiol by placing the solution in an ultrasonic both for at least 10 minutes. The thiols used were n-dodecanethiol or a 20/80 w/w mixture of 1-hexadecanethiol and 1-decanethiol. The thiol solution was added to the substrate, placed on a thermostated hot-stage (95-120° C.), using a syringe equipped with a 0.2 μm filter to cover the entire surface. Occasionally, thiol solution was added when dewetting of the surface was noted. After 2 hours, the substrate was removed and the excess thiol and initiator gently removed by rinsing with ethanol and subsequent drying under nitrogen.

Cells were constructed by pairing two substrates and fixing them using a UV-curable acrylate based adhesive (bisphenol A ethoxylate diacrylate containing 0.5% w/w 1-hydroxy cyclohexyl phenylketone). The cell gap was set using glass spacers (typically 4-15 μm; Philips Research, Eindhoven, The Netherlands). The cells were filled ("layer 5") using capillary motion with a liquid crystal at elevated temperature, well above the clearing point of the mesogen. After complete filling, the cell was allowed to gradually cool down to room temperature.

The invention claimed is:

1. An alignment layer capable of aligning liquid crystal material, the alignment layer comprising: a first sublayer which is a solid organic layer having regions capable of aligning the liquid crystal material in a first alignment; and a second sublayer having regions capable of aligning the liquid crystal material in a second alignment, the first and the second alignments being different, the second sublayer overlaying the first sublayer and covering in accordance with a pre-determined pattern the first sublayer to provide, at desired locations, second sublayer regions capable of aligning the liquid crystal material and, at desired locations, regions of the underlying first sublayer that are not covered by the second sublayer, wherein the first sublayer is, at an interface of the first and the second sublayers, chemically linked to the second sublayer.

2. The alignment layer of claim 1, wherein the first sublayer is chemically linked to the second sublayer by means of a reaction between a first chemical group present on the first sublayer at the interface and a second chemical group present on the second sublayer at the interface.

3. The alignment layer of claim 1, wherein the second sublayer is a solid organic layer, a photo-patternable organic layer, an organic monolayer, or an organic self-assembled monolayer.

4. The alignment layer of claim 1, wherein one of a chemical group present on the first sublayer, called the first chemical group, and a chemical group present on the second sublayer, called the second chemical group, is sensitive to actinic radiation such that when having received a suitable dose of such radiation, said one of the first and the second chemical group is at least to a lesser extent capable of reacting with the other of the first and the second chemical groups, than when said one of the first and the second chemical group was not irradiated.

5. The alignment layer of claim 1, wherein one of a chemical group present on the first sublayer, called the first chemical group, and a chemical group present on the second sublayer, called the second chemical group, is obtainable by means of actinic radiation from a precursor group or a combination of precursor groups, the one of the first and the second chemical groups being at least to a lesser extent capable of reacting with the other one of the first and the second chemical groups than the one of the first and the second chemical groups obtained from the precursor group or the combination of precursor groups.

6. The alignment layer of claim 1, wherein the second sublayer is obtainable by pattern-wise depositing a second sublayer-forming material onto the first sublayer.

7. An optical or electro-optical device comprising the alignment layer of claim 1.

8. The optical or electro-optical device of claim 7, wherein the device is a security feature on a banknote, a credit card, or other objects, which are to be protected from forgery.

9. The alignment layer of claim 1, wherein the solid organic layer is a polymeric layer or a polymer precursor layer, and the second sublayer is a solid organic layer, a photo-patternable organic layer, an organic monolayer, or an organic self-assembled monolayer.

10. The alignment layer of claim 1, wherein the first sublayer is capable of aligning the liquid crystal material in a planar alignment.

11. The alignment layer of claim 1, wherein the second sublayer is capable of aligning the liquid crystal material in a homeotropic alignment.

12. An alignment layer capable of aligning liquid crystal material, the alignment layer comprising:
  a first sublayer having first regions capable of aligning the liquid crystal material in a first alignment, the first regions having been formed by selectively irradiating an unsaturated moiety in said first sublayer to reduce a capability of said first regions to react with a second chemical group; and
  a second sublayer having second regions capable of aligning the liquid crystal material in a second alignment, the second regions having been formed by reacting said second chemical group with said unsaturated moiety in said first sublayer outside said first regions, the first and the second alignment being different,
  the second sublayer overlaying the first sublayer and covering in accordance with a pre-determined pattern the first sublayer to provide, at desired locations, second sublayer regions capable of aligning the liquid crystal material and, at desired locations, regions of the underlying first sublayer that are not covered by the second sublayer, wherein the first sublayer is, at an interface of the first and the second sublayers, chemically linked to the second sublayer.

13. The alignment layer of claim 12, wherein the second chemical group comprises at least one of a thiol group, an amino group, or a group that is photo-cleavable or thermo-cleavable to produce a free radical.

14. The alignment layer of claim 13, wherein the second chemical group comprises a thermo-cleavable group to produce a free radical.

15. The alignment layer of claim 12, wherein the second chemical group comprises a thiol group.

16. The alignment layer of claim 12, wherein the second chemical group comprises an amino group.

17. The alignment layer of claim 12, wherein the second chemical group comprises a photo-cleavable group to produce a free radical.

18. The alignment layer of claim 12, wherein the first sublayer is capable of aligning the liquid crystal material in a planar alignment.

19. The alignment layer of claim 12, wherein the second sublayer is capable of aligning the liquid crystal material in a homeotropic alignment.

20. An optical or electro-optical device comprising the alignment layer of claim 12.

21. The optical or electro-optical device of claim 20, wherein the device is a security feature on a banknote, a credit card, or other objects, which are to be protected from forgery.

22. The alignment layer of claim 12, wherein the first sublayer is photo-alignable.

* * * * *